United States Patent [19]

Story

[11] Patent Number: 5,541,638
[45] Date of Patent: Jul. 30, 1996

[54] USER PROGRAMMABLE ENTERTAINMENT METHOD AND APPARATUS

[75] Inventor: Guy A. Story, New York, N.Y.

[73] Assignee: AT&T Corp., Murray Hill, N.J.

[21] Appl. No.: 267,681

[22] Filed: Jun. 28, 1994

[51] Int. Cl.$^6$ .................................................. H04N 7/173
[52] U.S. Cl. ........................ 348/7; 348/13; 455/4.2
[58] Field of Search ............................. 348/7, 12, 13, 348/6, 906; 455/4.2, 5.1, 6.1; 358/86; H04N 7/173, 7/16

[56] References Cited

U.S. PATENT DOCUMENTS

| | | |
|---|---|---|
| 4,395,780 | 7/1983 | Gohm et al. . |
| 4,602,279 | 7/1986 | Freeman ................................. 348/473 |
| 4,949,187 | 8/1990 | Cohen . |
| 4,995,078 | 2/1991 | Monslow et al. . |
| 5,027,400 | 6/1991 | Baji et al. ................................ 348/10 |
| 5,130,792 | 7/1992 | Tindell et al. . |
| 5,132,992 | 7/1992 | Yurt et al. ................................. 348/7 |
| 5,133,079 | 7/1992 | Ballantune et al. ..................... 348/7 |
| 5,220,420 | 6/1993 | Hoarty et al. . |
| 5,247,347 | 9/1993 | Litteral et al. . |
| 5,357,276 | 10/1994 | Banker et al. ........................... 348/12 |
| 5,410,343 | 4/1995 | Coddington et al. ..................... 348/7 |

*Primary Examiner*—Safet Metjahic
*Assistant Examiner*—Chris Grant

[57] ABSTRACT

The present invention provides a user programmable entertainment method and system that provides varied and ongoing custom entertainment services. The method of the present invention provides an entertainment signal comprising a sequence of discrete expressive works to an end user. The discrete expressive works represented in the entertainment signal may be either specifically requested by the user or selected according to user-specified parameters. According to the present invention, a user defines a sequence of user preference items which together comprise a user preference signal. The user preference signal is then communicated to a remotely located program processor. The program processor selects a plurality of discrete expressive works that conform to the user preference item definitions. An entertainment signal comprising the selected expressive works is then communicated over a communication link to the receiving means located in the user node.

9 Claims, 3 Drawing Sheets

USER PROGRAMMABLE ENTERTAINMENT METHOD AND APPARATUS

FIELD OF THE INVENTION

The present invention relates generally to the field of entertainment communication services, and particularly to those services employing digital audio and video transmission signals.

BACKGROUND OF THE INVENTION

The advent of digital signal compression and increased communication bandwidth availability has made possible the realization of custom home entertainment services such as, for example, video-on-demand. In the past, the communications infrastructure provided only for broadcast entertainment. Consequently, in order to enjoy custom entertainment, one was required to purchase or rent entertainment storage devices such as video tapes, audio tapes or compact discs.

It is now possible, however, for a user to establish a point-to-point connection with an entertainment data base to retrieve a work of entertainment, for example, a movie, to view at any time. This provides an advantage over broadcast television of allowing a user to experience entertainment at a user-specified time. An example of such a system, known as a video-on-demand system, is disclosed in U.S. Pat. No. 5,247,347. According to standard video-on-demand systems, a user specifies a title of a video work, and the video piece is provided to the user from the data base over a virtual circuit connection in a communication network. The term video as used herein in conjunction with the words "signal" or "work" refers to either video alone or video with accompanying audio. In contrast, the use of the term audio refers to solely audio.

Broadcast video, such as an ordinary television broadcast, as opposed to video-on-demand, offers the advantage of providing ongoing, varied entertainment. For example, a television station may offer a broadcast schedule consisting of a mix of news programs, game shows, situation comedies and movies over the course of an evening. Broadcast entertainment allows users to enjoy ongoing entertainment without requiring the user to specify each title.

As a result, the entertainment consumer may presently select to receive either ongoing and varied entertainment through broadcast transmissions or custom, discrete entertainment video-on-demand technology.

Similarly, the concept of an analogous audio-on-demand system is plainly feasible. Audio-on-demand has not received much attention, however, perhaps because of the perception that the time required to select a particular musical work, which in current popular music typically has a five minute or less duration, does not justify such capability. An audio-on-demand system similar to the video-on-demand system may also have less of a market because consumers are more likely to purchase a desired musical piece than they would a video work. Consumers purchase musical works with the expectation of listening to the musical piece at a far higher repetition rate than they would a video recording. As a result, the combination of the time and effort required for using audio-on-demand and the popularity of purchasing musical recordings presently renders audio-on-demand less desirable than video-on-demand.

Furthermore, as in the case of video, consumers also have the option of listening to broadcast audio which provides varied and ongoing audio entertainment. Broadcast audio eliminates the inconvenience of constantly choosing new audio works. Moreover, home musical playback equipment can also offer limited ongoing and varied audio entertainment, such as a compact disc player with a multiple disc magazine. The drawback of such systems is that the consumer is nevertheless limited to selections from his or her own collection.

SUMMARY OF THE INVENTION

The present invention provides a user programmable entertainment method and system that provides varied and ongoing custom entertainment services. The method of the present invention provides an entertainment signal comprising a sequence of discrete expressive works to an end user. The discrete expressive works represented in the entertainment signal may be either specifically requested by the user or selected according to user-specified parameters.

According to the present invention, a user defines a sequence of user preference items, each defining a block of time in an entertainment signal, which together comprise a user preference signal. The user preference signal is then communicated to a remotely located program processor. The program processor selects a plurality of discrete expressive works that conform to the user preference item definitions. An entertainment signal comprising the selected expressive works is then communicated over a communication link to the receiving means located in the proximity of the user.

The entertainment signal may comprise an audio signal consisting of a plurality of musical, news or other audibly expressive works or, alternatively, a video signal consisting of a plurality of television or motion picture video works. The entertainment signal may suitably comprise a digital data signal compressed using standard data compression techniques.

The above discussed features, as well as additional features and advantages of the present invention, will become apparent by reference to the following detailed description and accompanying drawings.

DETAILED DESCRIPTION OF THE DRAWINGS

Figure 1:
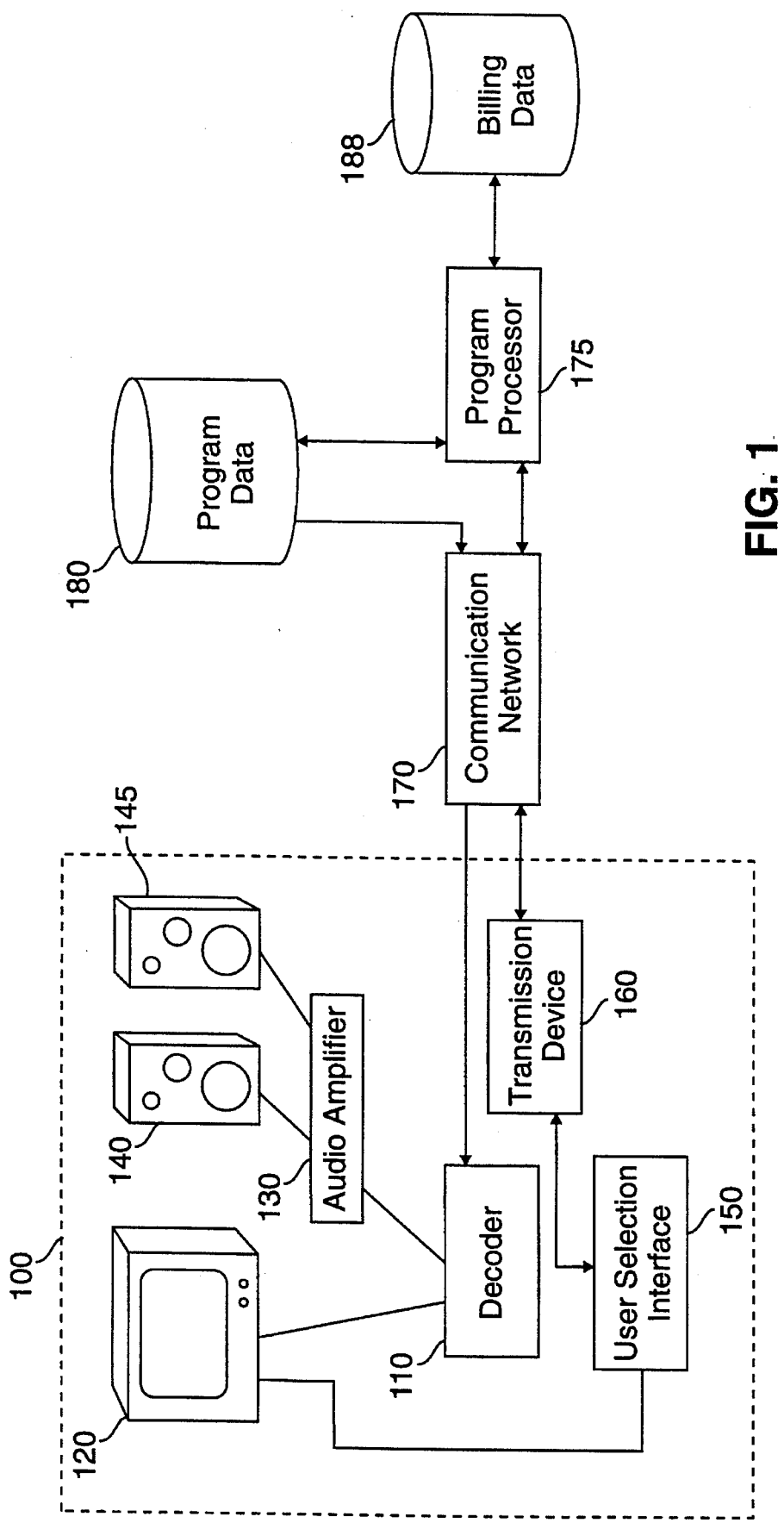
FIG. 1 illustrates an exemplary user-programmable entertainment system operable to provide custom audio and video signals according to one aspect of the present invention.

FIG. 1 shows an exemplary system for providing an entertainment signal comprising a plurality of discrete expressive works, the entertainment signal being defined by a consumer or user. A discrete expressive work comprises a singular piece of entertainment such as, for example, an episode of a television program, a movie, a song or a symphony. A discrete expressive work may ordinarily be referenced by title, although in some circumstances more information is required, such as a featured artist or the year of publication.

Consider, for example, a consumer or user of video services who desires to view, in sequence, one hour of news followed by two hours of situation comedies from the 1950's or 1980's, followed by a motion picture. The system in FIG. 1 allows the user to generate such a request and receive the appropriate or conforming television shows and movies.

In the exemplary system described below, each user of the entertainment services provided by the present invention requests and obtains entertainment services through a user node 100. The user node 100 consists of a decoder 110 connected to both a video display 120 and an audio amplifier 130, and a user selection interface 150 connected to both a transmission device 160 and the video display 120. The video display 120 comprises an ordinary television capable of receiving and displaying NTSC television signals. It is to be noted that the video display 120 may suitably be capable of receiving and audibly reproducing accompanying television audio signals. The audio amplifier 130 comprises a stereo receiver and amplifier which is further connected to a pair of loudspeakers 140 and 145.

The decoder 110 is connected to an external communication network 170. The decoder 110 comprises any suitable device for decompressing digital signals encoded according to a standard format, for example, one of the Motion Picture Expert Group (MPEG) formats. The decoder 110 further contains digital to analog conversion means.

The transmission device 160 is also connected to the communication network 170. The transmission device 160 may suitably comprise telephone terminal equipment or a modem. The communication network 170 may suitably be any network operable to provide a point-to-point digital and analog signal communications. An example of a point-to-point digital data network capable of providing video data to individual users in a video-on-demand system is discussed in U.S. Pat. No. 5,247,347, which is incorporated herein by reference.

A remotely located program processor 175 is also connected to the communication network 170. The program processor 175 is located at a location central to a plurality of user nodes which are similar to the user node 100. The program processor 175 comprises a computing device that operates to execute the functions within the flow chart discussed below in connection with FIGS. 2 and 3. The program processor 175 includes a program storage means for storing operating software.

The program processor 175 is operably connected to a data storage device 180, and a billing data storage device 188. A suitable configuration of a program processor, a data storage device, a billing storage device, and a communication network is disclosed in U.S. patent application Ser. No. 08/056,973 entitled "Integrated Television Services System" filed May 3, 1993, which is also assigned to the assignee of the present invention and incorporated herein by reference.

The data storage device 180 stores various expressive works, such as television shows, movies and news programs in compressed digital data format. Although shown as a singular device, the data storage device 180 may comprise a plurality of storage devices which are switchably connected to the communication network 170. A suitable data storage configuration is disclosed in U.S. patent application Ser. No. 07/997,985 entitled "Program Server for Interactive Television System" filed Dec. 28, 1992, which is assigned to the assignee of the present invention and incorporated herein by reference.

The above described components operate in the following manner to provide entertainment signals. The user invokes the entertainment system by sending a start control signal to the program processor 175. To do so, the user enters a start request into the user selection interface 150. The user selection interface 150 provides a start signal to the transmission device 160, which in turn provides the start signal to the program processor 175 through the communication network 170.

The program processor 175 then solicits the user to define the user preference signal. To this end, the program processor 175 sends prompt signals through the communication network 170 to the user selection interface 150 through the transmission device 160. The prompt signals, which prompt the user to define the user preference signal, are communicated to the user through either a display means located on the user selection interface 150 or the video display 120.

The custom user preference signal may comprise, for example, a sequential list of movies, television shows, or other works, that should be transmitted in the entertainment signal. The user preference signal is organized as a sequence of user preference items. Each user preference item (UPI) contains information about the desired attributes for a specific block of time in the entertainment signal. The UPI may contain information specifying either a particular discrete expressive work (DEW), for example, a motion picture title, or one or more attributes common to a plurality of DEWs, such as the genre or time period of a motion picture. In addition to selecting attributes or a title for each UPI, the user also defines the duration of each UPI, and may also select a particular starting time. A menu-driven program executed by the program processor 175 to achieve the foregoing is described below in connection with FIG. 2.

An exemplary user preference signal is shown in Table 1.

TABLE 1

| UPI 1 | genre: | news (national) |
|---|---|---|
|  | duration: | 1 hour |
|  | starting time: | 7:00 p.m. |
| UPI 2 | genre: | situation comedy |
|  | time period: | 1950's or 1980's |
|  | duration: | until 10:00 p.m. |
| UPI 3 | genre: | series ("Twin Peaks") |
|  | duration: | 1 episode |

Details regarding the generation of such a user preference signal are discussed below in connection with FIG. 2.

The user selections defining the user preference signal are entered in the user selection interface 150. The user selection interface 150 thereafter provides the user preference signal either as a batch, or contemporaneously as it is being defined, to the transmission device 160. The transmission device 160 transmits the user preference signal to the program processor 175 over the communication network 170.

To accomplish the above-described tasks, the user selection interface 150 and transmission device 160 may comprise any suitable means that allow the user to make selections and transmit the result. For example, a telephone terminal device may serve as the user selection interface 150 and transmission device 160. See, for example, U.S. Pat. No. 5,247,347 for an example of a video-on-demand system that receives user requests over a telephone network. Alternatively, interactive television means may be used, and an infrared remote control may comprise the user selection interface 150. In such a case, the interactive television transmission signal may comprise the user preference signal.

After the user preference signal is defined, the program processor 175 facilitates transmission of the entertainment signal as described below. For each UPI in the user preference signal, the program processor first selects one or more appropriate DEWs meeting the UPI-defined requirements. Before the entertainment signal can be transmitted, however, the program processor 175 provides a control signal to the data storage device 180 to establish a point-to-point connection, also called a virtual circuit, with the user node 100.

The program processor 175 then locates the storage address of video or audio data for the first selected discrete expressive work within the data storage device 180. The program processor 175 then sends a control signal commanding the data storage device 180 to begin transmitting the data at the located storage address to the user station 100 over the communication network 170. After the data for the first DEW has been transmitted, the program processor 175 repeats the above operations for each DEW until the entire entertainment signal corresponding to the user preference signal has been transmitted. A more detailed explanation of the above described functions is given below in connection with FIG. 3.

The operation of the program processor 175 may be demonstrated by reference to an example. To this end, consider, for example, the user preference signal defined in Table 1 above. At 7:00 p.m., the program processor 175 locates the storage address of a national news program in a program storage device 180. The digital video data is then transmitted to the user located at the node 100. Before the news program is over, the program processor 175 then locates the data for the first randomly selected situation comedy from the 1950's or 1980's. Then, at the completion of the news program, the program processor 175 commands the data storage device 180 to begin transmitting data for the situation comedy.

Returning to the general operation of the system, the data storage device 180 provides the entertainment signal, which is in the form of a compressed video and/or audio digital signal, to the decoder 110 through the communication network 170. The decoder 110 decompresses the entertainment program signal and converts the signal to the appropriate analog signal format, discussed further below. The decoder then provides the converted entertainment signal to a device that renders the signal perceptible to humans, such as for example, the video display 120 and/or the amplifier 130 and speakers 140, 145.

The conversion of the decompressed digital signal to the appropriate analog signal compatible with current audio and video components is well known. In the case of video entertainment, the decoder 110 further converts the decompressed digital television signal to an analog NTSC video signal in order to be compatible with a standard television. Such conversion would be known to those of ordinary skill in the art. In the case of purely audio entertainment, the decompressed digital audio signal should be converted to an analog audio signal. Furthermore, the user may desire that the video display 120 and audio amplifier 130 both include switching devices that allow the user to switch between receiving broadcast signals on an antenna or cable connection and compressed digital signals from the decoder 110. Suitable switching devices are well known.

Additionally, the program processor 175 from time to time provides billing information to the billing data storage device 188. The exact method of billing is a business decision, but may include charging the user for each DEW included within the entertainment signal. For example, the user may be billed $1.00 for an episode of "I Love Lucy" while being billed $6.00 for a first run motion picture. In such a case, the data within the data storage device 180 for each DEW preferably includes its price data. The program processor 175 may suitably retrieve the price data from the data storage device 180 at the beginning of the transmission of each DEW and then transmit it to the billing storage device 188 at the conclusion of the entire entertainment signal.

Figure 2:
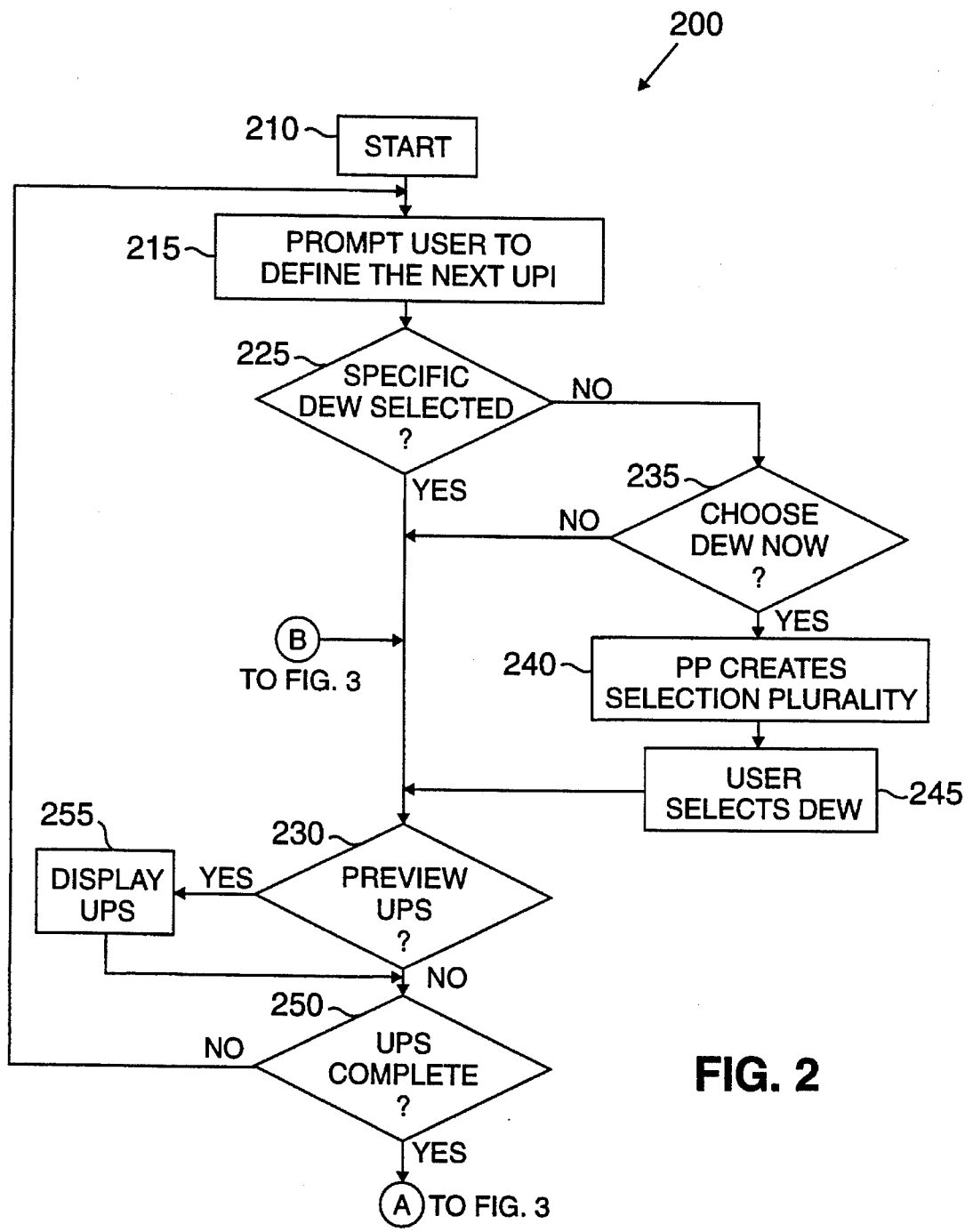
FIG. 2 illustrates a functional flow diagram of the operations performed by a program processor to define the user preference signal utilized in the exemplary system in FIG. 1.
Figure 3:
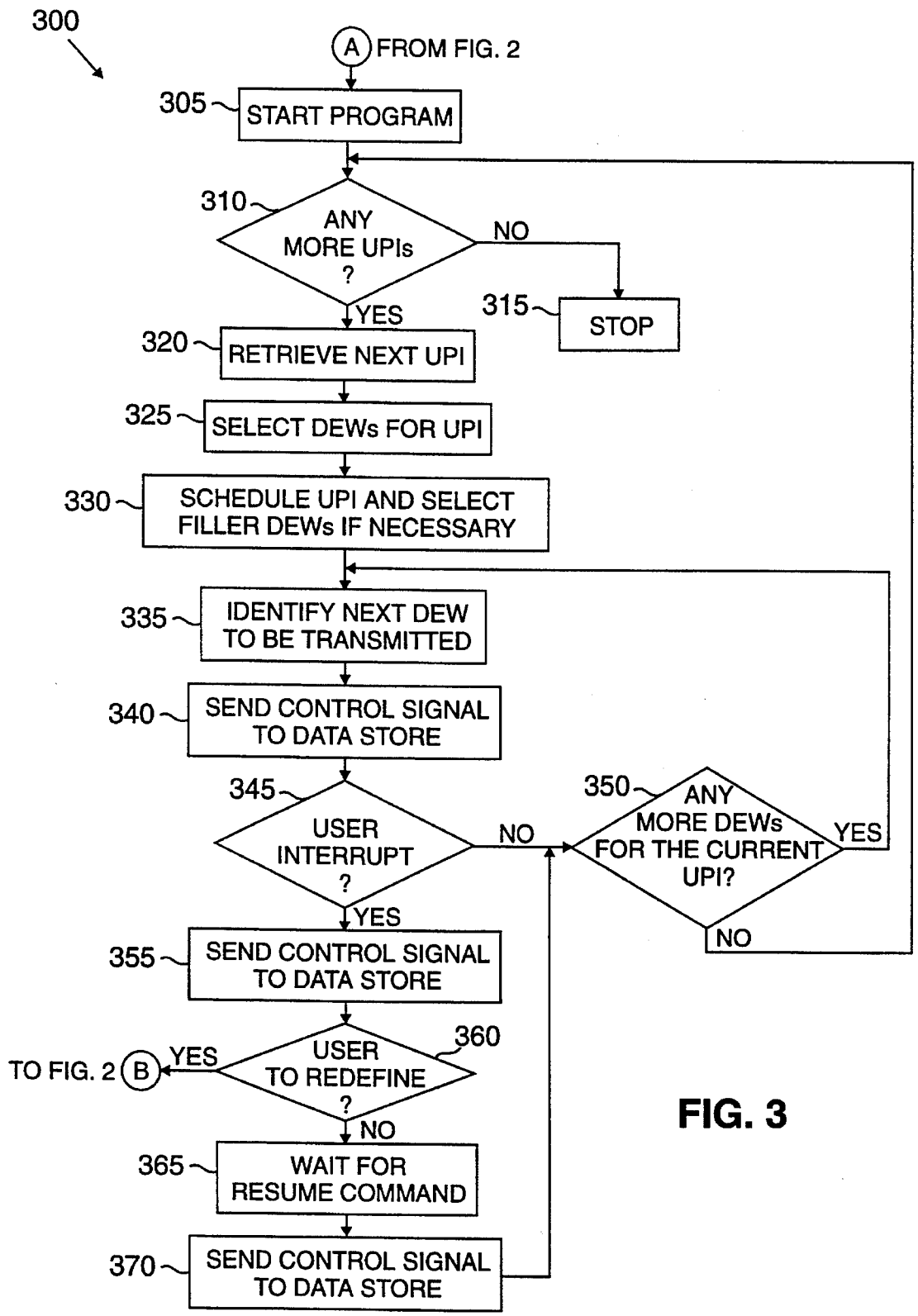
FIG. 3 illustrates a functional diagram of the operations performed by the program processor to provide an entertainment signal that conforms to the user preference signal.

FIGS. 2 and 3 illustrate a functional flow diagram of the operations of the program processor 175 from FIG. 1. Those of ordinary skill in the art could readily program the program processor in a manner suitable to perform the functions illustrated in flow diagram 200 in FIG. 2. The processor executing the steps in the flow diagram 200 enables the user to define a user preference signal comprising a sequence of user preference items. It should be noted that the functions of FIG. 2 operate in conjunction with a system wherein the user preference signal is generated from a menu-driven interactive system. Modifications, such as the modification of the flow diagram 200 to accommodate, for example, a natural language processor user interface would be known to one skilled in the art.

In step 210, the program starts upon detection of a start signal from the transmission device 160 from FIG. 1 indicating the presence of a user request to define a user preference signal. In step 215, the user defines one of the UPI's of the user preference signal, which contains information describing a discrete expressive work (DEW) or block of DEWs to be included in the entertainment signal. The UPI definition in step 215 is preferably menu driven and allows the user to select either attributes describing one or more DEWs or a specific DEW.

A sample menu for a purely audio program might allow the user to define: 1) a time period; 2) a genre; 3) an artist; or 4) a specific title. Upon selection of any particular menu item, the user may be prompted to enter a name or title, or further menus may appear. For example, if the user selects 2) genre, a second menu might appear, such as: 1) classical; 2) jazz; 3) pop; or 4) dance. The extent to which the user may define a combination of such attributes will vary extensively from system to system.

A menu further prompts the user to define the duration of the UPI as well. The duration of a UPI may be defined by a time limit, a specific number of DEWs, or an ending time. An exemplary UPI may consist of: Genre=Jazz; Time Period=1952–1956 and Duration=40 minutes.

In addition, the user may also be prompted to enter other information such as a specified start time for UPI. Finally, the user is also prompted to select alternatively a particular DEW by title, such as the motion picture "Casablanca". UPIs comprising particularly described DEWs such as "Casablanca" are referred to herein as specific DEWs. UPIs comprising attribute information are referred to herein as non-specific DEWs.

The processor allows the user to choose selections from the menu driven prompts in step 215 until the processor receives a command indicating the UPI definition is complete. The processor then executes step 225.

In step 225, the processor determines whether the defined UPI contains information specifying a particular DEW, or in other words, comprises a specific UPI. If so, then the processor executes step 230. If not, however, and the UPI contains attribute information, then the processor executes step 235. In step 235, the processor queries the user whether the user would like to select a particular DEW from a list of several DEWs that conform to the UPI attribute specifications. If the answer in step 235 is yes, then the processor executes step 240. If, however, the answer in step 235 is no, then the processor returns to step 230.

In step 240, the processor creates a selection list of the available DEWs meeting the UPI attribute specifications.

The processor may create the list by accessing a database containing DEW titles indexed by attributes. In the exemplary system in FIG. 1, the data storage device 180 may contain such a database. For example, for UPI 2 of the user preference signal in Table 1 above, the selection list comprises a list of situation comedies from the 1950's or 1980's. For a long list, perusal of the selection list may be menu driven as well. After creation of the selection list, the processor executes step 245. In step 245, the processor receives a user selection of one or more DEWs from the list, thereby converting the UPI to a specific UPI. The processor then executes step 230.

The execution of step 230 signifies that the current UPI has been defined, comprising either a specific UPI or a non-specific UPI. In step 230, the processor queries the user whether to display the user preference signal (UPS), or, in other words, list of UPIs, in its current state. If not, the processor executes step 250. If so, the processor provides the list of UPIs for display in step 255 and then executes step 250.

In step 250, the processor queries the user whether the UPS has been completely defined. If so, the processor may then execute step 305 of FIG. 3. If not, however, the processor returns to step 215 in order to allow the generation of another UPI.

FIG. 3 illustrates in flow diagram 300 the operations of the program processor 175 that provide the entertainment signal once the UPS is defined.

In step 305, the processor initializes contact with the data storage device 180 and instructs the data storage device 180 to establish a virtual circuit connection over the communication network 170. In step 310, the processor determines whether the UPS contains any more UPIs. For the first iteration, the answer in step 310 will ordinarily be yes. If, at some point, the answer to step 310 is no, then the processor proceeds to step 315 and stops. Otherwise, the processor executes step 320 wherein the next UPI is retrieved for processing.

After retrieving the next UPI in step 320, the processor executes step 325. In step 325, the DEW or DEWs comprising the UPI are identified. If the next UPI is a specific UPI, the DEW or DEWs are already identified and the processor proceeds to step 330. For a non-specific UPI, however, the processor must select one or more appropriate DEWs for inclusion in the entertainment signal. To this end, the processor generates a selection list of DEWs that fit the attributes defined in the UPI. Once the list is generated, the processor selects, at random, the appropriate number of DEWs needed to comply with the UPI durational specification.

To generate the selection list, the processor accesses a database of available DEW titles indexed by attribute as discussed above in connection with step 240. The DEW titles in the database should also contain durational information. Thus, for a UPI specifying a durational limit of an unspecified number of DEWs, such as, for example, two hours of sitcoms, the processor may select the maximum number of DEWs that will not exceed the durational specification. The processor will not normally select a number of DEWs that would surpass the time limit.

After selecting the one or more DEWs for the UPI, the processor executes step 330. In step 330, the processor determines whether filler work is required to maintain an uninterrupted entertainment signal. A filler work is a DEW selected by the processor to fit an undefined slot of time in the UPS. One or more filler work DEWs are required when the UPS time and durational requirements cannot be strictly met. Consider, for example, the definition of UPI 2 in the sample UPS of Table 1, wherein the durational specification is "until 10:00 p.m." It is unlikely that the selected DEWs, which in this case are 1950's or 1980's situation comedies, when transmitted in sequence, will end precisely at 10:00 p.m. In such a situation, filler work is required.

In step 330, therefore, the processor reviews the selected DEWs' durations and the UPI durational specification and determines if and how much filler work is required. The filler work should be chosen from a plurality of DEWs stored within a storage device such as the storage device 180 from FIG. 1. The filler work may comprise relatively short DEWs of varying lengths. The processor may then either insert all the filler work at the end of a particular UPI or intermix the filler work with selected DEWs within the UPI. Other schemes may be employed where the user may in some respects control the choice of filler work, but the resulting added complexity in the UPS definition sequence may not be desirable. Once the scheduling of the DEWs and filler works for the UPI is completed, the processor executes step 335.

In step 335, the processor identifies the next DEW to be transmitted and locates or identifies its storage address. The next DEW is determined by the UPI schedule developed in step 330, above. Thus, the next DEW may comprise a selected DEW or a filler work DEW. At the time the next DEW, now the current DEW, is to be transmitted, the processor executes step 340. A DEW is to be transmitted at the time when the previous DEW is completed, or, in the case of the first DEW of the first UPI, at an assigned start time. In step 340, the processor sends a control signal to the data storage device to begin transmitting the data corresponding to the DEW to the user. While the DEW is being transmitted, the processor proceeds to step 345.

The processor remains at step 345 until either an interrupt is received or until the current DEW is almost over. By almost over, it is meant that the time left in the current DEW is sufficient for the processor to execute steps 350, 310, 320, 325 and 330 before the DEW transmission is completed. Because these steps require a minimal amount of processing, with the possible exception of accessing a database in steps 325 and 330, one or two minutes prior to the end of the previous DEW should be sufficient. When the current DEW is almost over, the processor executes step 350.

If an interrupt is received during the execution of step 345, the processor executes step 355. In step 355, the processor sends a control signal to the data storage device to halt the transmission of the entertainment signal. The processor then executes step 360. In step 360, the processor determines whether the user is interrupting to redefine the UPS or the user merely wants to pause the transmission. If the answer in step 360 is yes, in other words, the user has interrupted to redefine the UPS, the program returns to step 230 in FIG. 2. If, however, the answer in step 360 is no, then the processor executes step 365.

In step 365, the processor waits for a resume command from the user. The entertainment signal is not transmitted during the interrupt. After receipt of a resume command from the user, the processor executes step 370. In step 370, the processor sends a control signal to the data storage device to resume transmission of the current DEW. Upon completion of step 370, the processor returns to step 345.

In step 350, the processor determines whether any more DEWs are scheduled for the current UPI. If not, the program returns to step 310 to determine if there are any more UPIs. If the answer in step 350 is yes, however, the processor returns to step 335 to identify the next scheduled DEW in the current UPI.

In an alternative embodiment of the above system, the definition of the user preference signal, as discussed in connection with FIG. 2, may be accomplished exclusively by the user selection interface 150 within the user station 100. In this embodiment, the user selection interface 150 would include a processor that executes the functions shown in flow diagram 200. The user would then completely define the user preference signal prior to establishing connection with the program processor 175. The program processor 175 would otherwise operate to perform the functions in flow diagram 300 as discussed above.

In another embodiment of the above system, the program processor 175 and its complete functionality may be located in the user node 100. The program processor 175 would then communicate through the communication link 170 to send command signals to the data storage device 180 and/or billing device 188. A further modification would be to combine the functionality of the user selection interface 150, the decoder 110, the transmission device 160 and program processor 175, or any subset thereof, into one self-contained subsystem, such as, for example, a personal computer system. In yet another embodiment, the user selection interface of one user may be operable to define a user preference signal for an entertainment signal to be provided to the user node of a second user.

In another alternative embodiment, instead of executing a menu-driven interactive program such as the one discussed in connection with FIG. 2, the program processor 175 may suitably be programmed to allow the user to enter natural language commands such as, for example:

From 7:00 P.M. until 11:00 P.M. I'd like first, one hour of news, mostly national, with some international and local, followed by a mix of sitcoms from the 50's and 80's until roughly 10:00 P.M., then an episode of "Twin Peaks" and finishing with a short weather report.

Natural language interpreters which could be used to generate a user preference signal from such commands are well-known in the art.

In yet another alternative embodiment of the above system, the user may be given the option to include live media, in other words, television or radio broadcasts, within the entertainment program signal. Thus, for example, the user may define a user preference item as either a live network news broadcast or a live sports program. In such a system, a source of compressed digital live broadcast signals would be connected to the program processor 175. For example, this source may comprise a common television or radio signal reception device and a means to convert a signal into compressed digital form.

To facilitate the inclusion of live media within the entertainment signal, the program processor 175 should operate essentially as described above, except that when the next UPI includes a live broadcast, the program processor 175 would instruct the source of live broadcasts to provide a data signal to the user node 100 over the communication network 170 instead of the data storage device 180. In this alternative embodiment, the step 350 of FIG. 3 will include sending a control signal to the source of live broadcasts to provide the live signal to the user node 100. Means for switching between the live broadcast source and the data storage source 180 will be apparent to one of ordinary skill in the art.

While an exemplary embodiment of the current invention has been shown and described, various modifications and substitutions may be made without deviating from the spirit and scope of the invention. Thus, while the example describes the use of a standard NTSC analog television receiver, other video display devices including a video monitor, digital television, high definition television and the like may be used. Likewise, while the use of compressed digital data signals are used to transmit the entertainment signal, analog signals or uncompressed digital signals may be used. Such signals could be transmitted directly to the display device or audio amplifier without first entering a decoder. Although the use of analog signals or uncompressed digital signals would eliminate the need for a decoder 110, such signals would require more transmission bandwidth.

I claim:

1. An entertainment system, comprising:

a storage device containing a plurality of discrete expressive works;

a programming processor for distributing a selected sequence of the discrete expressive works over a communication medium for sequential presentment to a user over a user-specified period of time in response to a user preference signal; and a terminal for generating and transmitting the user preference signal to the programming processor, the user preference signal comprising a sequence of user preference items and the user-specified period of time, each user preference item identifying a discrete expressive work or one or more desired attributes of a plurality of the discrete expressive works from which the programming processor selects a discrete expressive work for the user.

2. The entertainment system of claim 1, further comprising a receiver for broadcasts of discrete expressive works to be distributed by the programming processor in response to the user preference signal.

3. The entertainment system of claim 1, wherein the terminal includes a transducer for presenting the sequence of discrete expressive works to the user.

4. The entertainment system of claim 1, wherein the terminal generates the user preference signal using a menu-driven interactive program.

5. The entertainment system of claim 1, wherein the terminal generates the user preference signal using a natural language interpreter.

6. The entertainment system of claim 1, further comprising a storage device for billing information provided by the programming processor in response to the user preference signal.

7. A method of providing ongoing and varied entertainment, comprising the steps of:

storing a plurality of discrete expressive works at a remote location;

distributing a selected sequence of the discrete expressive works from the remote location over a communication medium for sequential presentment to a user over a user-specified period of time in response to a user preference signal; and generating the user preference signal at a user location and transmitting the user preference signal to the remote location, the user preference signal comprising a sequence of user preference items and the user-specified period of time, each user preference item identifying a discrete expressive work or one or more desired attributes of a plurality of the discrete expressive works.

8. A method of providing ongoing and varied entertainment, comprising:

receiving broadcasts of discrete expressive works at a remote location;

distributing a selected sequence of the discrete expressive works over a communication medium for sequential presentment to a user over a user-specified period of time in response to a user preference signal; and generating the user preference signal at a user location and transmitting the user preference signal to the remote location, the user preference signal comprising a sequence of user preference items and the user-specified period of time, each user preference item identifying a discrete expressive work or one or more desired attributes of a plurality of the discrete expressive works.

9. A method of providing ongoing and varied entertainment, comprising:

storing a plurality of discrete expressive works at a remote location;

receiving broadcasts of discrete expressive works at the remote location;

distributing a selected sequence of the discrete expressive works over a communication medium for sequential presentment to a user over a user-specified period of time in response to a user preference signal; and generating the user preference signal at a user location and transmitting the user preference signal to the remote location, the user preference signal comprising a sequence of user preference items and the user-specified period of time, each user preference item identifying a discrete expressive work or one or more desired attributes of a plurality of the discrete expressive works.

\* \* \* \* \*